(12) United States Patent
Nishimoto et al.

(10) Patent No.: US 8,778,088 B2
(45) Date of Patent: Jul. 15, 2014

(54) FOREIGN MATTER REMOVAL DEVICE, FOREIGN MATTER REMOVAL METHOD AND FOREIGN MATTER REMOVAL SYSTEM

(75) Inventors: Takeshi Nishimoto, Tokyo (JP); Masaya Ichihara, Tokyo (JP); Yo Komatsu, Tokyo (JP); Satoshi Mashiba, Sioux City, IA (US); Suguru Sakuramoto, Tokyo (JP); Shinji Shimamura, Tokyo (JP); Ryuzo Urakami, Yao (JP)

(73) Assignees: Itoham Foods Inc., Hyogo (JP); Mayekawa Mfg, Co., Ltd, Tokyo (JP); Hosoda Kogyo Co., Ltd, Osaka (JP)

( * ) Notice: Subject to any disclaimer, the term of this patent is extended or adjusted under 35 U.S.C. 154(b) by 688 days.

(21) Appl. No.: 13/012,150

(22) Filed: Jan. 24, 2011

(65) Prior Publication Data

US 2012/0186608 A1    Jul. 26, 2012

(51) Int. Cl.
   *B08B 7/04*     (2006.01)
   *B08B 3/04*     (2006.01)
   *B65G 49/04*    (2006.01)

(52) U.S. Cl.
   USPC ............. 134/10; 134/25.1; 134/25.5; 134/32; 134/60; 134/61; 134/104.2; 134/104.4

(58) Field of Classification Search
   USPC ........... 134/10, 11, 25.1, 25.5, 21, 32, 33, 37, 134/60, 61, 104.2, 104.4, 184
   See application file for complete search history.

(56) References Cited

U.S. PATENT DOCUMENTS

| | | | | |
|---|---|---|---|---|
| 1,474,277 A | * | 11/1923 | Martel et al. | 68/184 |
| 2,244,035 A | * | 6/1941 | Whitmore et al. | 134/18 |
| 2009/0090138 A1 | * | 4/2009 | Wang | 68/19 |

FOREIGN PATENT DOCUMENTS

| | | | |
|---|---|---|---|
| JP | 2872102 | * | 3/1999 |
| JP | 2872102 B2 | | 3/1999 |

* cited by examiner

*Primary Examiner* — Saeed T Chaudhry
(74) *Attorney, Agent, or Firm* — Rossi, Kimms & McDowell LLP (57) ABSTRACT

A foreign matter removal device 10 preliminary cleans the work 50 in a bucket 12 housed in an input tank 15, then further cleans the work 50 in buckets 13, 14 housed in cleaning tanks 16, 17 by agitating cleaning liquid while inverting the buckets to transfer the work to a subsequent bucket. Particularly, the bottom of the cleaning tank is formed such that the nearer to a center of the bottom, the deeper the bottom becomes. The cleaning liquid overflowing from the cleaning tanks are stored in auxiliary tanks 22, 23. First and second ejection units 29*a*, 29*b* are arranged at different heights in the cleaning tank to generate a circulating flow in the cleaning liquid.

8 Claims, 7 Drawing Sheets

Fig. 9

# FOREIGN MATTER REMOVAL DEVICE, FOREIGN MATTER REMOVAL METHOD AND FOREIGN MATTER REMOVAL SYSTEM

TECHNICAL FIELD

The present invention relates to a device, a method and a system for removing foreign matters on a work by immersing the work in the cleaning liquid and agitating.

BACKGROUND ART

A foreign matter removal device that removes foreign matters on the work by immersing the work of a foodstuff such as primal/sub-primal cuts of meat is known. The foreign matters are such as hair, loose bones, insects, paper and straw. In this type of removal device, the works are put in a bucket and transferred and the cleaning liquid is fluidized in a cleaning tank by agitating the cleaning liquid so as to collide the works against the inner wall of the bucket or with each other. In this manner, the foreign matters on the work can be scraped off by friction force.

Patent Document 1, JP2872102B proposes a foreign matter removal device with a plurality of buckets arranged from an input end to a discharge end. The cleaning liquid for cleaning the work is stored in a bucket of each cleaning tank and the foreign matters on the work stored in the bucket are removed by agitating the cleaning liquid and transferred to the next bucket arranged on the downstream side thereof toward the discharge end by inverting the bucket. In the removal device, the cleaning liquid overflowing from the cleaning tank when a pumping unit supplies more cleaning liquid, is stored in a storage tank, and the cleaning liquid stored in the storage tank is injected from injection nozzles so as to fluidize the liquid in the cleaning tank and remove foreign matters on the works in the bucket.

With the removal device of JP2872102B, the removed foreign matters are led to the storage tank with the cleaning liquid overflowing from the cleaning tank and captured by a strainer provided in the storage tank. Meanwhile, the foreign matters sinking to the bottom of the cleaning tank are led upward by upstream flow of the cleaning liquid ejected from an ejection pipe provided at the bottom of the cleaning tank. The foreign matters lifted by the upstream flow of the cleaning liquid are captured by the strainer in the storage tank.

CITATION LIST

[Patent Literature]
[PTL 1]
JP2872102B

SUMMARY OF INVENTION

Technical Problem

However, in the removal device of JP2872102B, while light foreign matters are led by the ejection pipe to the upper side of the cleaning tank, the foreign matters with a high-specific gravity are hard to lead to the upper side. The heavy foreign matters cannot be led to the storage tank along with the cleaning liquid overflowing from the cleaning tank and thus, cannot be captured by the strainer in the storage tank. Further, when injecting the cleaning liquid upward to the cleaning tank by the ejection pipe, the foreign matters having settled to the bottom, are flowed upward as well. This results in contaminating the cleaning liquid in the cleaning tank.

Furthermore, a guide member is provided to prevent the upflow of the settled foreign matters. However, it is very difficult to completely prevent the settled foreign matters from flowing upward and thus this is still an issue.

In the removal device of JP2872102B, the circulating flow is formed by injecting the cleaning liquid from a single injection nozzle against the sides of the bucket. However, the bottom of the tank has through-holes, which disturbs the circulating flow. Thus, it is sometimes difficult to agitate the cleaning liquid sufficiently in the bucket. Especially, there is a possibility that the circulating flow formed in the bucket can escape outside of the bucket via the through-holes while flowing the foreign matters at the bottom of the cleaning tank upward.

In view of the above issues, an object of the present invention is to provide a device, a method and a system for removing foreign matters, that can efficiently remove the foreign matters on the work and reliably collect the settled foreign matters.

Solution to Problem

To solve the above problems, an aspect of the present invention is a foreign matter removal device for removing foreign matters on a work. The foreign matter removal device may include, but is not limited to: a plurality of cleaning tanks which are disposed from an upstream input end to a downstream discharge end and store cleaning liquid for cleaning the work; a plurality of buckets which are respectively housed in the plurality of cleaning tanks; an auxiliary tank which stores the cleaning liquid that overflows from the plurality of cleaning tanks; a first ejection unit which is arranged in each of the cleaning tanks to eject the cleaning liquid stored in the auxiliary tank from one side of each of the cleaning tanks to an opposite side; and a second ejection unit which is arranged in each of the cleaning tanks to eject the cleaning liquid stored in the auxiliary tank from the opposite side to the one side. The first and second ejection units are arranged at different heights in each of the cleaning tanks so as to generate a circulating flow of the cleaning liquid in each of the cleaning tanks. Each of the cleaning tanks has a bottom having a shape such that the nearer to a center of the bottom, the deeper the bottom becomes. The cleaning liquid is agitated in the bucket to remove the foreign matters adhered to the work and the bucket is inverted to transfer the work to a subsequent bucket arranged on a downstream side toward the downstream discharge end.

According to the aspect of the present invention, each of the cleaning tanks has a bottom having a shape such that the nearer to a center of the bottom, the deeper the bottom becomes. Thus, heavy foreign matters among the foreign matters removed from the work sink and settle to the bottom as if to be gathered to the bottom. The foreign matters having settled at the bottom are isolated from the upper side where the circulating flow of the cleaning liquid is formed and thus, safe from being lifted by the circulating flow. The first ejection unit ejects the cleaning liquid from one side to the other side of the cleaning tank and the second ejection unit ejects the cleaning liquid stored in the auxiliary tank from the other side to the one side. And the first and second ejection units are arranged at different heights in each of the cleaning tanks so as to generate a circulating flow of the cleaning liquid in each of the cleaning tanks. The circulating flow formed in this manner has little disturbance regardless of the structure (such as with or without the through-holes) of the buckets to be housed in the cleaning tank. Thus, the work can be efficiently stirred to remove the foreign matters. Particularly, even in the case wherein the through-holes are arranged on the bottom of the bucket, the flow toward the bottom of the cleaning tank through the through-holes is suppressed, thereby preventing the foreign matters having settled at the bottom of the cleaning tank from being lifted. In this manner, with the foreign matter removal device of the aspect of the present invention, it is possible to exert superb cleaning capability.

It is preferable that the directions of the first and second ejection units ejecting the cleaning liquid are parallel to each other.

By ejecting the cleaning liquid in two parallel directions by the first and second ejection units, as a part of flows forming the circulating flow, the ratio of the upward flow and the downward flow created when the cleaning liquid hits the side walls of the cleaning tank, can be equal. Thus, the circulating flow can be formed evenly in the cleaning tank. As a result, it is possible to form the circulating flow efficiently in the cleaning tank and thus to achieve the foreign matter removal device with superb cleaning capability.

As another aspect of the foreign matter removal device, the foreign matter removal device may also include a discharge valve which is provided at a lowest part of the bottom of the cleaning tank.

According to another aspect, the foreign matters having settled at the bottom of the cleaning tank can discharged outside via the discharge valve provided at the lowest part of the bottom of the cleaning tank without being lifted into the cleaning liquid. Specifically, the cleaning liquid stored in the cleaning tank can be kept clean while the foreign matters at the bottom are discharged properly. As a result, it is possible to achieve the foreign matter removal device with superb capability of removing foreign matters.

In yet another aspect of the present invention, the foreign matter removal device may also include a divider which isolates the cleaning tanks from one another so that the cleaning liquid in each of the cleaning tanks does not mix.

According to the yet another aspect, the cleaning tanks are isolated from one another by the divider. Thus, the inside of the cleaning tank where the cleaning liquid is supplied can remain clean.

In a further aspect of the present invention, the foreign matter removal device may also include an air introducing unit which is provided on a lower side of the bucket which is housed in the cleaning tank and introduces air bubbles in the cleaning liquid to the work stored in the bucket.

According to the further aspect of the present invention, the air introducing unit introduces air bubbles into the circulating flow formed in the cleaning tank so as give buoyancy to the work to be immersed in the circulating flow. This makes the movement of the work to be stirred by the circulating flow more active. The work collides against the bucket or with another work to increase the friction force acting on the work. In this manner, the foreign matters on the work are firmly scraped off by friction force.

In yet further aspect of the present invention, the foreign matter removal device may also include a safety cover that surrounds the cleaning tanks.

According to the yet further aspect of the present invention, the safety of operators is assured by providing the safe cover surrounding the area where the work is conveyed and the buckets are inverted. The safety cover may have windows that are made of polycarbonate being a transparency material. By this, the operator can visually observe inside of the area where the buckets are in operation.

In yet further aspect of the present invention, the work includes foodstuffs such as primal and sub-primal cuts of meat. As described above, the foreign matter removal device can firmly remove the foreign matters by stirring the work in the liquid. This is very suitable for cleaning foodstuffs.

To solve the above problems, another aspect of the present invention is a foreign matter removal method for removing foreign matters on a work. The foreign matter removal method may include, but is not limited to, the steps of: agitating cleaning liquid in a plurality of buckets which are housed in a plurality of cleaning tanks so as to remove foreign matters on a work, the plurality of cleaning tanks being disposed from an upstream input end to a downstream discharge end; inverting the bucket to transfer the work to a subsequent bucket arranged on a downstream side toward the downstream discharge end; storing in an auxiliary tank the cleaning liquid that overflows from the plurality of cleaning tanks; forming a circulating flow of the cleaning liquid in the cleaning tank by ejecting the cleaning liquid stored in the auxiliary tank from one side of the cleaning tank to an opposite side by means of a first ejection unit and from the opposite side to the one side by means of a second ejection unit, the first and second ejection units being arranged at different heights in each of the cleaning tanks; discharging the foreign matters that settle at a bottom of the cleaning tank via a discharge valve to outside, the bottom of each of the cleaning tanks having a shape such that the nearer to a center of the bottom, the deeper the bottom becomes, the discharge valve being disposed at the bottom of each of the cleaning tanks.

According to the foreign matter removal method of the another aspect of the present invention, the above foreign matter removal device (including the aspects mentioned above) is preferably achievable.

In yet another aspect of the present invention, a foreign matter removal system for removing foreign matters on a work, may include, but is not limited to: the foreign matter removal device described above; one of a supply conveyor and a supply shoot which is disposed at the upstream input end and supplies the work that has foreign matters thereon to the foreign matter removal device; and one of a discharge conveyor and a discharge shoot which is disposed at the downstream discharge end and discharges the work whose foreign matters have been removed from the foreign matter removal device.

According to the foreign matter removal system of the yet another aspect of the present invention, the supply conveyor supplies the work to the above foreign matter removal device (including the above aspects), the foreign matter removal device removes foreign objects from the work, and the discharge conveyor discharges the work. In this manner, the entire process of removing the foreign matters from the work can be automated.

Effects of the Invention

According to the present invention, each of the cleaning tanks has a bottom having a shape such that the nearer to a center of the bottom, the deeper the bottom becomes. Thus, heavy foreign matters among the foreign matters removed from the work sink and settle to the bottom as if to be gathered to the bottom. The foreign matters having settled at the bottom are isolated from the upper side where the circulating flow of the cleaning liquid is formed and thus, safe from being lifted by the circulating flow. The first ejection unit ejects the cleaning liquid stored in the auxiliary tank from one side to the other side of the cleaning tank and the second ejection unit ejects the cleaning liquid stored in the auxiliary tank from the other side to the one side. And the first and second ejection units are arranged at different heights in each of the cleaning tanks so as to generate a circulating flow of the cleaning liquid in each of the cleaning tanks. The circulating flow formed in this manner has little disturbance regardless of the structure (such as with or without the through-holes) of the buckets to be housed in the cleaning tank. Thus, the work can be efficiently stirred to remove the foreign matters. Particularly, even in the case wherein the through-holes are arranged on the bottom of the bucket, the flow toward the bottom of the cleaning tank through the through-holes is suppressed, thereby preventing the foreign matters having settled at the bottom of the cleaning tank from being lifted. In this manner, with the foreign matter removal device of the aspect of the present invention, it is possible to exert superb cleaning capability.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 1:
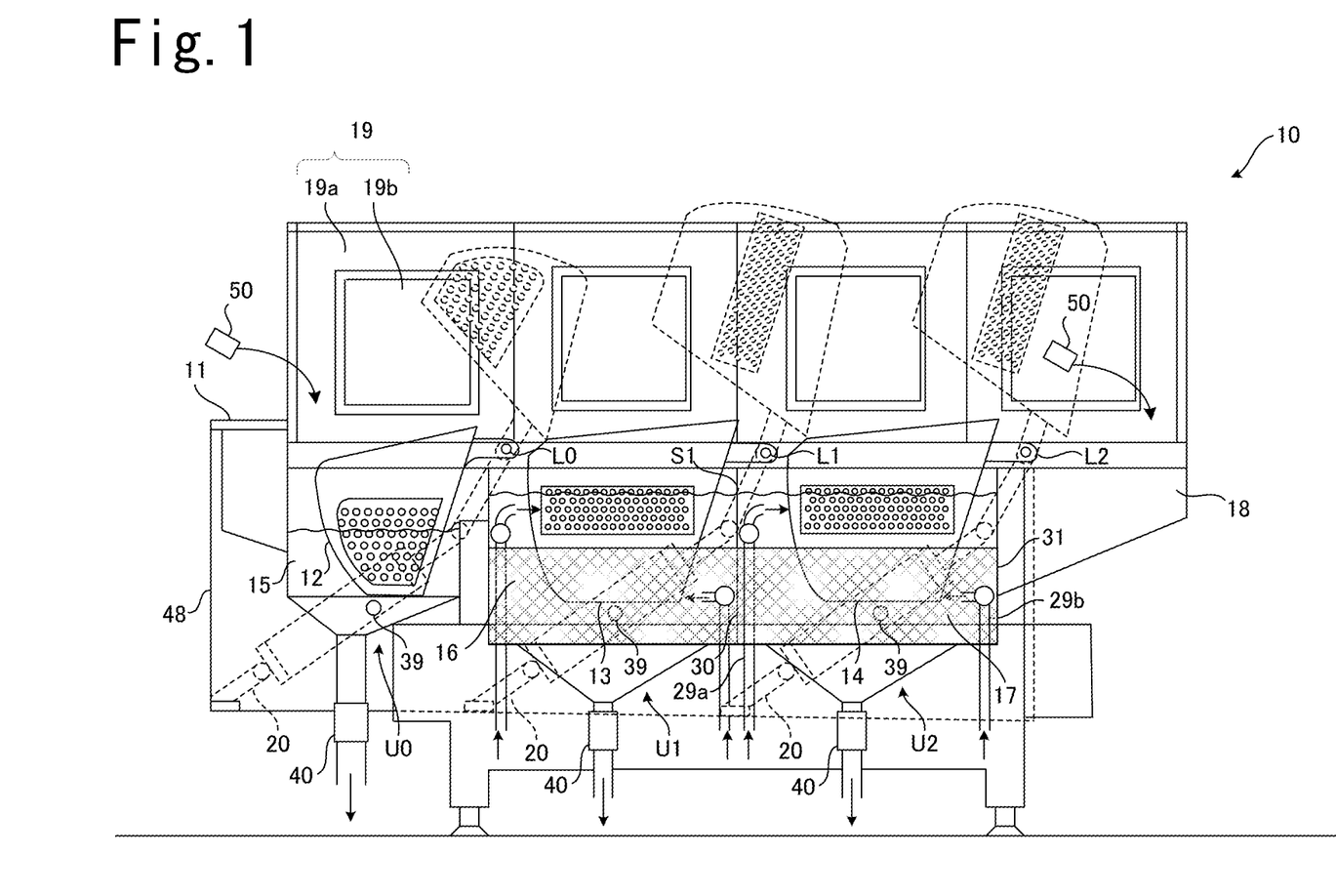
FIG. 1 is a sectional view of an inner structure of a foreign matter removal device of an aspect of the present invention.
Figure 2:
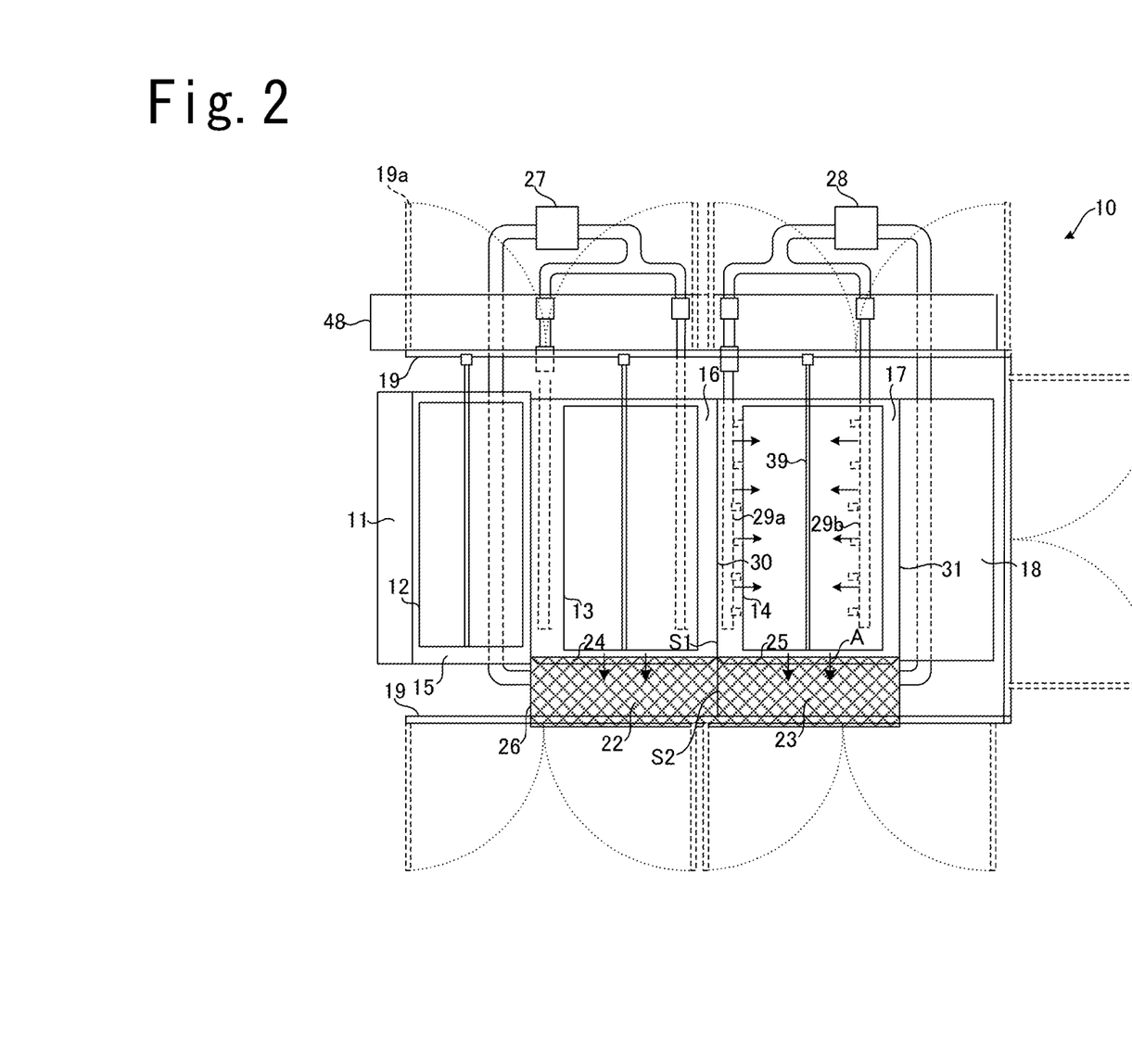
FIG. 2 is a plain view of the inner structure of the foreign matter removal device of the aspect of the present invention.
Figure 3:
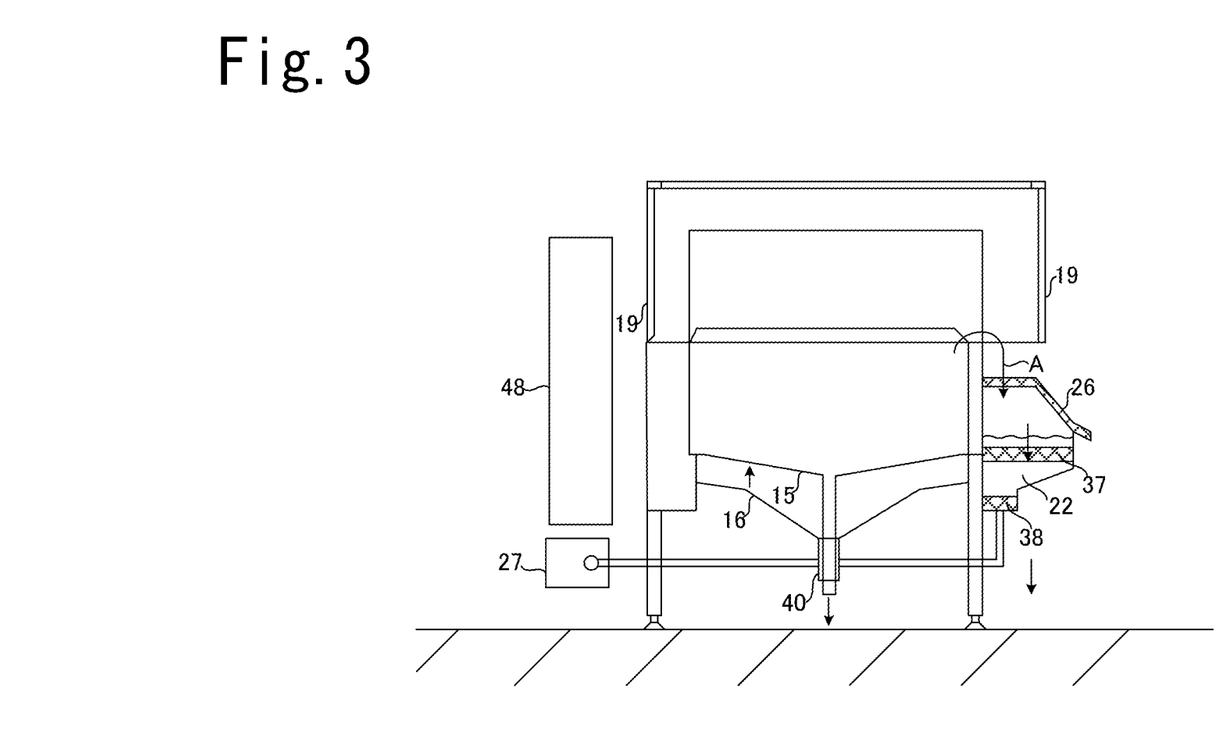
FIG. 3 is a left lateral view of the inner structure of the foreign matter removal device of the aspect of the present invention.

A schematic structure of a foreign matter removal device of an aspect of the present invention is explained in reference to FIG. 1 to FIG. 3. FIG. 1 is a sectional view of an inner structure of the foreign matter removal device 10 of the aspect of the present invention. FIG. 2 is a plain view of the foreign matter removal device 10 from above. FIG. 3 is a left lateral view of the foreign matter removal device 10. A thickness of some parts is not depicted in FIG. 1 to FIG. 3 to facilitate a graphic explanation.

The foreign matter removal device 10 mainly includes a work input part 11 where the work 50 is inputted, an input bucket 12 where the work inputted from the work input part 11 is stored, cleaning buckets 13 and 14 where the work 50 transferred from the input bucket 12 is stored, an input tank 15 where the input bucket 12 is housed, cleaning tanks 16 and 17 where the cleaning buckets 13 and 14 are housed respectively and a work discharge part 18 which discharges the work 50 whose foreign matters have been removed to outside.

Figure 4:
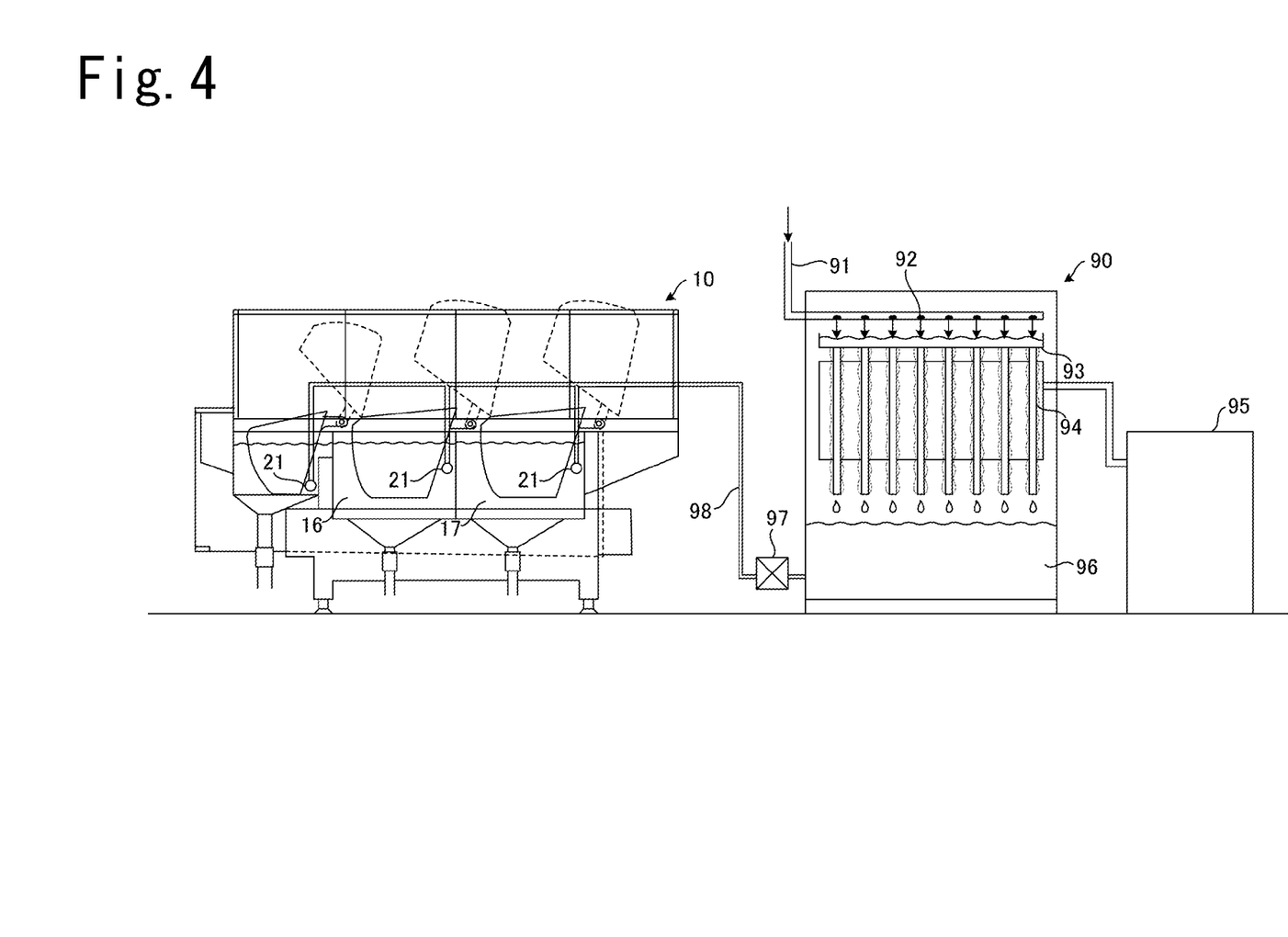
FIG. 4 is a sectional view of a chiller which cools cleaning water to be supplied to the foreign matter removal device of the aspect of the invention.

The input tank 15 and the cleaning tanks 16 and 17 are made of stainless steel. Each of the tanks has a cleaning space of an almost-rectangular shape whose top is open. The input tank 15 and the cleaning tanks 16 and 17 store the cleaning liquid. The cleaning liquid is tap water (city water) which is cooled to the range of 2° C. to 3° C. by a chiller 90. The chiller 90 is provided outside as shown in FIG. 4. The foreign matter removal device 10 of the aspect of the present invention removes foreign matters on the work 50 by agitating the cleaning liquid stored in the input tank 15 and the cleaning tanks 16 and 17 in such a state that the input bucket 12 and the cleaning buckets 13 and 14 are housed in the input tank 15 and the cleaning tanks 16 and 17 respectively.

A divider S1 isolates the input tank 15 and the cleaning tanks 16 and 17 from each other so that the cleaning liquid in each of the tanks does not mix. Thus, the cleaning liquid containing foreign matters do not enter from adjacent tank, which causes contamination in the tanks.

FIG. 4 is a schematic sectional view of the chiller 90 which cools the cleaning water to be used in the foreign matter removal device 10 of the aspect of the invention. The water (city water) at room temperature is introduced from the water supply pipe 91. The water supply pipe 91 has a plurality of openings 92. The water is supplied through the openings 92 and stored in a retaining container 93 which is a wide container arranged under the openings. The retaining container 93 has a number of cooled plates 94 which extend from the bottom of the retaining container 93 in a vertical direction. The cooled plates 94 are cooled by a refrigeration cycle 95 to below the freezing point. The retaining container 93 has through-holes (unshown) so that the cleaning liquid trickles down along a surface of each cooled plate 94 to a reservoir tank 96 provided under the cooled plates 94. The cooled plates 94 are cooled to below the freezing point and thus, the cleaning liquid trickling down on the surfaces of the cooled plates 94 through the through holes, freezes and forms a thin ice layer thereon. The cleaning liquid at room temperature is cooled to approximately between 2° C. to 3° C. by coursing down the ice layer formed on the surface of the cooled plate 94. The cleaning liquid is cooled to approximately between 2° C. to 3° C. by the cooled plates 94 as described above and then stored in the reservoir tank 96. The cleaning liquid approximately at 2° C. to 3° C. stored in the reservoir tank 96 is supplied from a water feeding part 21 of the foreign matter removal device 10 to the input tank 15 and the cleaning tanks 16 and 17 via a feeding pipe 98 is by means of a feeding pump 97.

In reference to FIG. 1 to FIG. 3, the work 50 is transferred to the work input part 11 by a transferring unit such as a belt conveyor. The work is foodstuffs such as primal and subprimal cuts of meat. The work is inputted in the foreign matter removal device 10 while foreign matters such as hair, loose bones, insects, paper and straw are still on the work 50. The foreign matters are removed in the cleaning tanks 16 and 17 in the manner described below.

The work is inputted from the work input part 11 and then stored in the input bucket 12. The input bucket 12 waits in a position that is illustrated with a solid line in FIG. 1. Once the work 50 is inputted in the input bucket 12, the work 50 is immersed in the cleaning liquid stored in the input tank 15 and the preliminary cleaning of the work 50 is performed by air bubbles introduced from an aeration pipe 39. In the preliminary cleaning, relatively large and heavy foreign matters on the work 50 are readily removed. Then, the input bucket 12 is inverted around an axis line L0 to a position that is illustrated with a dotted line in FIG. 1. Then, the work 50 stored in the input bucket 12 falls under its own weight into the cleaning bucket 13 housed in the cleaning tank 16. Once the work 50 is transferred to the cleaning bucket 13, the input bucket 12 is inverted around the axis line L0 in the inverse direction to return to the original position indicated with the solid line in FIG. 1. A new work 50 is inputted from the work input part 11 to repeat the above process.

The work 50 in the cleaning bucket 13 is cleaned with the cleaning liquid stored in the cleaning tank 16. The foreign matters that could not be removed in the input tank 15 are now removed in the cleaning tank 16. The cleaning liquid stored in the cleaning tank 16 moves in a prescribed pattern which is described later so that the work 50 collides against the inner wall of the cleaning bucket 13 or against another work 50. In this manner, the foreign matters on the work are scraped off by friction force.

While the work 50 is cleaned in the cleaning tank 16, the cleaning bucket 13 waits in a position indicated with a solid line in FIG. 1. Once the cleaning of the work 50 is done in the cleaning tank 16, the cleaning bucket 13 is inverted around an axis line L1 to a position indicated with a dotted line in FIG. 1. Then, the work 50 stored in the cleaning bucket 13 falls under its own weight into the cleaning bucket 14 housed in the cleaning tank 17. Once the work 50 is transferred to the cleaning bucket 14, the cleaning bucket 13 is inverted around the axis line L1 in the inverse direction to return to the original position indicated with the solid line in FIG. 1. A new work 50 is inputted from the input bucket 12 to repeat the above process.

The work 50 in the cleaning bucket 14 is cleaned with the cleaning liquid stored in the cleaning tank 17 in a manner similar to that of the cleaning tank 16. While the work 50 is cleaned in the cleaning tank 17, the cleaning bucket 14 waits in a position indicated with a solid line in FIG. 1. Once the cleaning of the work 50 is done in the cleaning tank 17, the cleaning bucket 14 is inverted around an axis line L2 to a position indicated with a dotted line in FIG. 1. Then, the work 50 stored in the cleaning bucket 14 falls under its own weight into the work discharge part 18. The work discharge part 18 has a transferring unit (unshown) such as a belt conveyor to transfer the cleaned work 50 to a next step such as a cooking step. Once the work 50 is transferred to the work discharge part 18, the cleaning bucket 14 is inverted around the axis line L2 in the inverse direction to return to the original position indicated with the solid line in FIG. 1. A new work 50 is inputted from the cleaning bucket 14 to repeat the above process.

As described above, the work 50 inputted in the foreign matter removal device 10 of the aspect of the present invention is transferred sequentially from the work input part 11 to the work discharge part 18. In the area where the work 50 is conveyed each of the buckets is inverted. In order to secure the safety of operators, a safety cover 19 surrounds the area. The safety cover 19 includes doors 19a which are supported so that the doors 19a can open and close on a supporting point as shown with dotted lines in FIG. 2. In the preferred embodiment, the doors 19a have windows 19b that are made of polycarbonate that is a transparency material. By this, the operator can visually observe inside of the foreign matter removal device 10 without opening the doors 19a.

The input bucket 12 and the cleaning buckets 13 and 14 are inverted by an angle-changing unit 20 which is arranged for each of the buckets. The angle-changing unit 20 includes a piston rod fixed to a shaft line and a pneumatic double-acting cylinder which contracts and expands the piston rod by air pressure. The angle-changing unit 20 is housed in a housing 48.

The foreign matter removal device 10 of the aspect of the present invention has a preliminary cleaning unit U0 and two cleaning units U1 and U2. The preliminary cleaning unit U0 includes the input bucket 12 and the input tank 15 to perform the preliminary cleaning of the work 50. The cleaning unit U1 includes the cleaning bucket 13 and the cleaning tank 16 and the cleaning unit U2 includes the cleaning bucket 14 and the cleaning tank 17 to further clean the work 50 after the preliminary cleaning. Each of the cleaning units U1 and U2 are fundamentally the same in structure unless otherwise indicated hereinafter.

The work 50 is inputted to the preliminary cleaning unit U0 and immersed in the cleaning liquid stored in the cleaning tank 15 and the preliminary cleaning of the work 50 is performed by air bubbles introduced from the aeration pipe 39. In the preliminary cleaning, relatively large and heavy foreign matters on the work 50 are readily removed. The work 50 having been preliminarily cleaned in the preliminary cleaning unit U0 is further cleaned in the cleaning units U1 and U2.

One side-wall of each of the cleaning tanks 16 and 17 of the cleaning units U1 and U2 is notched to form a notched portion 24 and 25. The cleaning liquid overflows from the cleaning tanks 16 and 17 from the notched portions 24 and 25 respectively in the direction of solid arrows A. Auxiliary tanks 22 and 23 are provided on the outer side of the notched portions 24 and 25 of the cleaning tanks 16 and 17 respectively. The auxiliary tanks 22 and 23 are arranged on the lower side of the notched portions 24 and 25 to receive the cleaning liquid overflowing from the cleaning tanks 16 and 17. A divider S2 isolates the auxiliary tanks 22 and 23 from each other so that the cleaning liquid flowing into each tank does not mix. In this manner, the overflowing cleaning liquid which has overflowed from the cleaning tanks 16 and 17 flows from the notched portions 24 and 25 into the auxiliary tanks 22 and 23 to be stored therein.

Each of the auxiliary tanks 22 and 23 opens at the top and has a wedge wire screen 26 to cover the top. The wedge wire screen 26 functions as a filter to remove the foreign matters in the cleaning liquid that overflows from the cleaning tanks 16 and 17 while passing through the filter. The wedge wire screen 26 is formed with an inclined surface so that the foreign matters captured by the wedge wire screen 26 are discharged outside along the inclined surface as shown in FIG. 3. The filtered cleaning liquid is stored in the auxiliary tanks 22 and 23.

The cleaning tank stored in each of the auxiliary tanks 22 and 23 is pumped to upper ejection portions 29a of an upper ejection unit and lower ejection portions 29b of a lower ejection unit by means of circulating pumps 27 and 28 and supplied to the cleaning tanks 16 and 17 again. In this manner, when the cleaning liquid pumped from the auxiliary tanks 22 and 23 is supplied to the cleaning tanks 16 and 17, the amount of the cleaning liquid in each of the cleaning tanks 16 and 17 increases. Thus, the overflowing cleaning liquid overflows from the notched portions 24 and 25 and is stored again in the auxiliary tanks 22 and 23.

Figure 5:
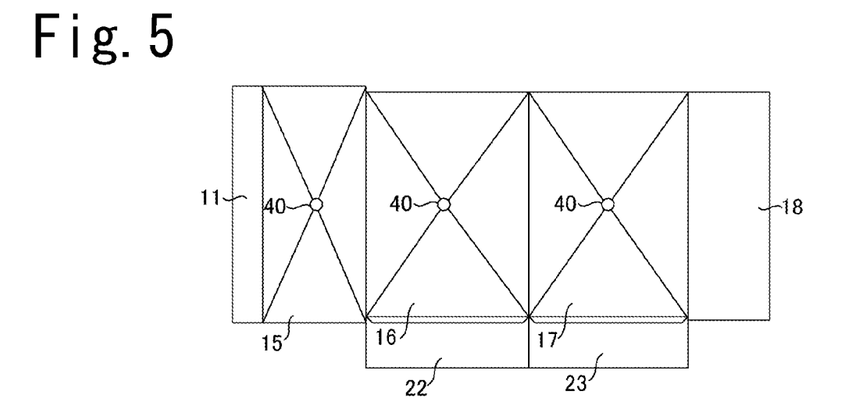
FIG. 5 is a plain view showing shapes of bottoms of cleaning tanks.

FIG. 5 is a plain view showing the shapes of the bottoms of the cleaning tanks 16 and 17. To show the shape of the bottom of the cleaning tanks 16 and 17, other parts such as a variety of buckets existing on the upper side are not illustrated accordingly.

Each of the input tank 15 and the cleaning tanks 16 and 17 has the bottom configured such that the nearer to a center of the bottom, the deeper the bottom becomes. Thus, foreign matters with higher specific gravity among the foreign matters removed on the upper side of each tank sink to the bottom and gather and settle to the bottom. A circulating flow is generated on the upper side in each of the cleaning tanks 16 and 17. The foreign matters that settle to the bottom of the cleaning tank 16, 17 are isolated from the circulating flow so that the circulating flow does not lift the foreign matters.

A discharge valve 40 is provided at a lowest part of the bottom in each of the input tank 15 and the cleaning tanks 16 and 17. The discharge valve, for instance, opens when the foreign matters accumulate at the bottom for a certain amount so that the accumulated foreign matters can be discharged outside without raising the accumulated foreign matters into the cleaning liquid in each of the input tank 15 and the cleaning tanks 16 and 17. Specifically, the cleaning liquid in each of the input tank 15 and the cleaning tanks 16 and 17 can be kept clean while the foreign matters accumulated at the bottom can be properly treated.

Figure 6:
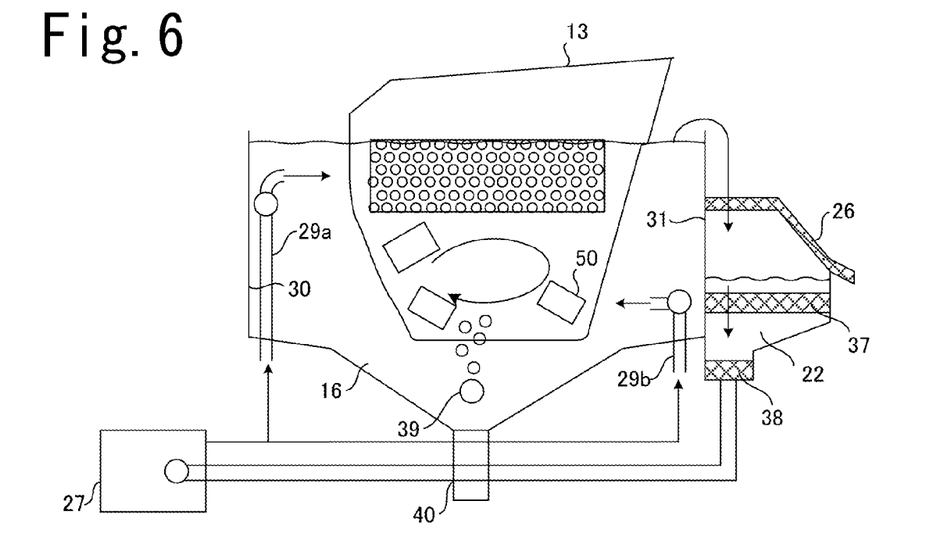
FIG. 6 is a sectional view schematically illustrating a circulating flow formed in the cleaning liquid stored in the cleaning tank.

FIG. 6 is a figure schematically showing the circulating flow formed in the cleaning liquid in the cleaning tank 16. The upper ejection portions 29a eject the cleaning liquid stored in the auxiliary tank 22 from one side 30 of the cleaning tank 16 to other side 31. The lower ejection portions 29b eject the cleaning liquid stored in the auxiliary tank in the opposite direction of the upper ejection portions 29a, i.e. from the other side 31 to the one side 30. The upper ejection portions 29a are positioned higher than the lower ejection portions 29b. This generates the circulating flow of the cleaning liquid in the cleaning tank 16 in such a direction to turn the work 50 as indicated with an arrow in FIG. 6.

The auxiliary tank 22 has filters 37 and 38 at the discharge part in an intermediate layer and the bottom respectively. The filters 37 and 38 filter the cleaning liquid containing the foreign matters discharged from the discharge part. This can maintain high cleanness of the cleaning liquid discharged from the auxiliary tank 22 by the circulating pump 27. Thus, the inside of the cleaning tank 16 where the cleaning liquid is supplied can remain clean.

FIG. 2 shows a plurality of the upper and lower ejection portions 29a and 29b disposed in pipes respectively so as to generate the circulating flow throughout the cleaning tank 16.

Figure 7:
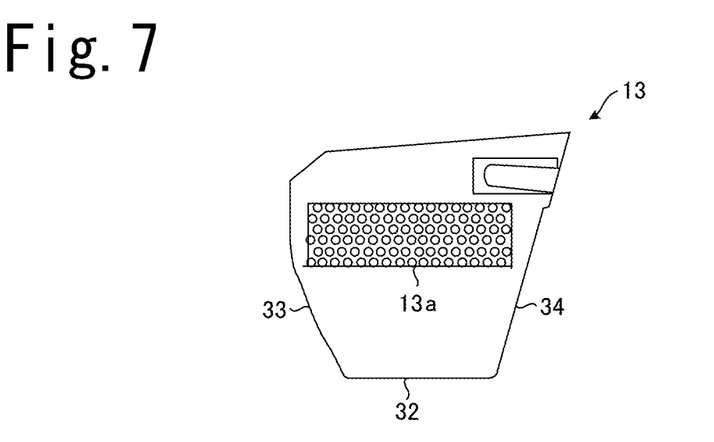
FIG. 7 is a front view of a cleaning basket.
Figure 8:
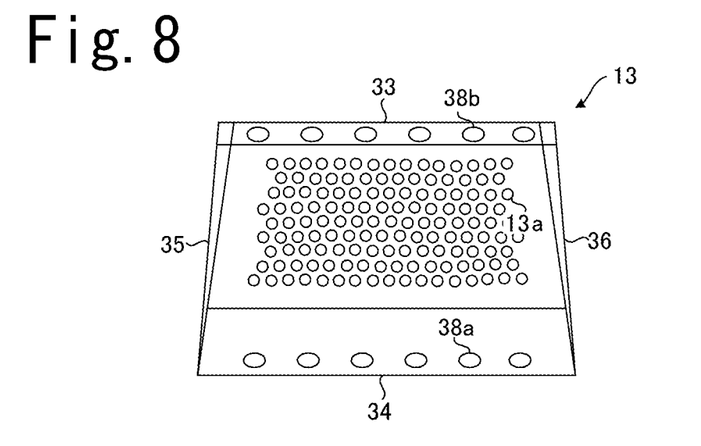
FIG. 8 is a plain view of the cleaning basket from above.

The structure of the cleaning bucket 13 is explained in detail in reference to FIG. 7 and FIG. 8. FIG. 7 is a front view of the cleaning bucket 13 and FIG. 8 is a plain view of the cleaning bucket 13 taken from above. The cleaning bucket 13 has a bottom side 32, inclined sides 33 and 34 and vertical sides 35 and 36. In a state wherein the cleaning bucket 13 is housed in the cleaning tank 16, the bottom side 32 is horizontally disposed, the inclined sides 33 and 34 inclining outward toward the top and facing each other and the vertical sides 35 and 36 being disposed in the direction approximately perpendicular to the inclined sides 33 and 34.

A plurality of through-holes 13a are provided in the bottom side 32 of the cleaning bucket 13 and the part facing the notched portion 24, 25. FIG. 2 also shows holes 38a and 38b for introducing the cleaning liquid to the cleaning bucket 13. The holes 38a and 38b are provided in the inclined sides 33 and 34 of the cleaning bucket 13. In the state wherein the cleaning bucket 13 is housed in the cleaning tank 16, the holes 38a and 38b respectively face the upper and lower ejection portions 29a and 29b. The cleaning liquid ejected from the upper and lower ejection portions 29a and 29b enters the cleaning bucket 13 through the holes 38a and 38b and generates the circulating flow in the cleaning bucket 13 as described above.

The cleaning bucket 13 is located on the upstream side of the cleaning bucket 14. Thus, the cleaning liquid stored in the cleaning tank 16 tends to contain larger foreign objects than the liquid stored in the cleaning tank 17. Thus, the cleaning bucket 13 has the through-holes 13a that are bigger than the through-holes 13a of the cleaning bucket 14. This enables larger foreign matters to leave the cleaning bucket 13. By this, the work 50 having been preliminarily cleaned in the input bucket 12 is further cleaned in two stages in the cleaning buckets 13 and 14. Thus, foreign matters of different sizes can securely removed, thereby improving the cleaning performance. In the preferred embodiment, the through-holes 13a of the cleaning bucket 13 has a diameter of 20 mm and the through-holes 13a of the cleaning bucket 14 has a diameter of 15 mm.

The input bucket 12 has a plurality of through-holes. The through-holes of the input bucket 12 have a diameter of 20 mm in the manner similar to those of the cleaning bucket 13 and are provided over the entire surface thereof. The work 50 is inputted from the work input part 11 and immersed in the cleaning liquid stored in the input tank 15 and the preliminary cleaning of the work 50 is performed by air bubbles introduced from the aeration pipe 39. In the preliminary cleaning, relatively large and heavy foreign matters on the work 50 are readily removed.

The aeration pipe 39 is arranged below the cleaning bucket 13 housed in the cleaning tank 16. The aeration pipe 39 introduces cleaned air toward the work 50 in the cleaning bucket 13. On the upper side of the aeration pipe 39, the above-described circulation flow is formed. The aeration pipe 39 introduces air bubbles into the cleaning liquid so as to give buoyancy to the work 50 being exposed to the circulating flow. Thus, the movement of the work 50 in the cleaning bucket 13 becomes more active and the foreign matters can be removed more firmly.

Alternatively, the aeration pipe 39 may eject mixed cleaning liquid (i.e. gas liquid) in which cleaned air is mixed instead of the cleaned air. In comparison to the case wherein the aeration pipe 39 ejects only air bubbles, the aeration pipe 39 can jet air bubbles more vigorously. As a result, the performance of removing foreign matters can be further improved.

In the foreign matter removal device 10 of preferred embodiment of the present invention has a sanitary structure in each pipe and valve that transports the cleaning liquid so that the pipes and valves can be easily disassembled and cleaned or monitored. As a result, the foreign matter removal device is superb from the perspective of good hygiene.

Figure 9:
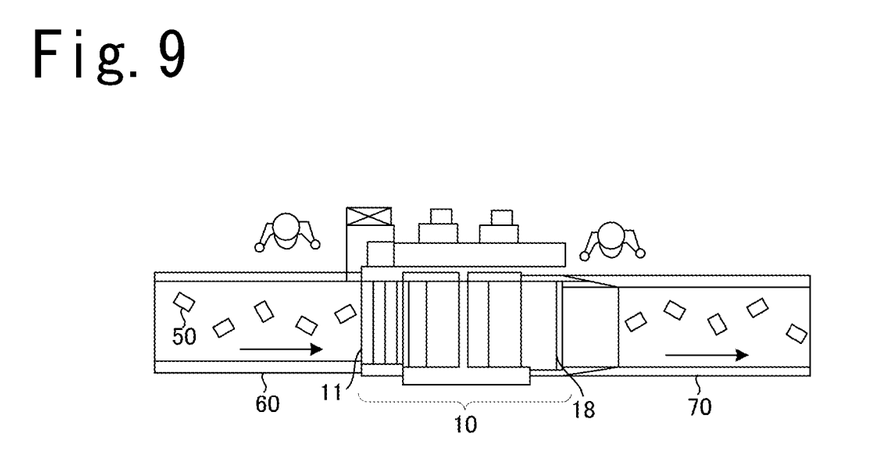
FIG. 9 is a plain view of an exemplary structure of a foreign matter removal system equipped with the foreign matter removal device of the aspect of the present invention.

FIG. 9 is a plain view of an exemplary case of the foreign matter removal system using the foreign matter removal device of the aspect of the present invention. The foreign matter removal system includes the above-described foreign matter removal device 10, a supply conveyor 60 at the work input part 11 and a discharge conveyor 70 at the work discharge part 18. The supply conveyor 60 disposed at the work inlet part 11 supplies the work 50 and the discharge conveyor disposed at the work discharge part 18 discharges the work 50 whose foreign matters have been removed. Specifically, the supply conveyor 60 supplies the work 50 to the foreign matter removal device 10, the foreign matter removal device 10 removes foreign objects from the work 50, and the discharge conveyor 70 discharges the work 50. In this manner, the entire process of removing the foreign matters from the work 50 can be automated.

In the preferred embodiment, the foreign matter removal system has the conveyors with automated conveying function at the work input part 11 and the work discharge part 18. Alternatively, it is possible to provide a shoot without the automated conveying function at least one of the work input part 11 and the work discharge part 18.

As described above, it is possible in the foreign matter removal device 10 to remove foreign matters on the work 50 efficiently regardless of the size and specific gravity and to reliably collect the settled foreign matters.

[Industrial Applicability]

The present invention is applicable to the device, method and system for removing foreign matters on a work by immersing the work in the cleaning liquid and agitating the cleaning liquid.

The invention claimed is:

1. A foreign matter removal device for removing foreign matters on a work, comprising:
    a plurality of cleaning tanks which are disposed from an upstream input end to a downstream discharge end and store cleaning liquid for cleaning the work;
    a plurality of buckets which are respectively housed in the plurality of cleaning tanks;
    a plurality of auxiliary tanks, with one of the plurality of tanks being provided for each of a respective one of the plurality of cleaning tanks, and arranged laterally to each of the plurality of cleaning tanks so as to store the cleaning liquid that overflows from each of the plurality of cleaning tanks;
    a dividing plate which divides each of the auxiliary tanks from the other of the auxiliary tanks so that the cleaning liquid that overflows from each of the plurality of cleaning tanks is not mixed with the cleaning liquid that overflows from the other cleaning tanks;
    a first ejection unit which is arranged in each of the cleaning tanks to eject the cleaning liquid stored in the auxiliary tank from one side of said each of the cleaning tanks to an opposite side; and
    a second ejection unit which is arranged in said each of the cleaning tanks to eject the cleaning liquid stored in the auxiliary tank from the opposite side to the one side,
    wherein the first and second ejection units are arranged at different heights in said each of the cleaning tanks so as to generate a circulating flow of the cleaning liquid in said each of the cleaning tanks,
    wherein each of the cleaning tanks has a bottom having a shape such that the nearer to a center of the bottom, the deeper the bottom becomes, and
    wherein the cleaning liquid is agitated in the bucket to remove the foreign matters adhered to the work and the bucket is inverted to transfer the work to a subsequent bucket arranged on a downstream side toward the downstream discharge end.

2. The foreign matter removal device according to claim 1, further comprising:
    a discharge valve which is provided at a lowest part of the bottom of the cleaning tank.

3. The foreign matter removal device according to claim 1, further comprising:
    a divider which isolates the plurality of cleaning tanks from each other so that the cleaning liquid in each of the cleaning tanks does not mix.

4. The foreign matter removal device according to claim 1, further comprising:
    an air introducing unit which is provided on a lower side of the bucket which is housed in the cleaning tank and introduces air bubbles in the cleaning liquid to the work stored in the bucket.

5. The foreign matter removal device according to claim 1, further comprising:
    a safety cover which surrounds the plurality of cleaning tanks.

6. The foreign matter removal device according to claim 1, wherein the work includes primal or sub-primal cut of meat.

7. A foreign matter removal system for removing foreign matters on a work, comprising:
    the foreign matter removal device of claim 1;
    one of a supply conveyor and a supply shoot which is disposed at the upstream input end and supplies the work that has foreign matters thereon to the foreign matter removal device;
    one of a discharge conveyor and a discharge shoot which is disposed at the downstream discharge end and discharges the work whose foreign matters have been removed from the foreign matter removal device; and
    a chiller which cools the cleaning liquid used in the foreign matter removal device,
    wherein the chiller has a cooled plate cooled to a temperature lower than a freezing point by means of a refrigeration cycle, and
    wherein the cleaning liquid trickles down along a surface of the cooled plate to a reservoir tank provided under the cooled plate.

8. A foreign matter removal method for removing foreign matters on a work, comprising the steps of:
    agitating cleaning liquid in a plurality of buckets which are housed in a plurality of cleaning tanks so as to remove foreign matters on a work, the plurality of cleaning tanks being disposed from an upstream input end to a downstream discharge end;
    inverting the bucket to transfer the work to a subsequent bucket arranged on a downstream side toward the downstream discharge end;
    storing cleaning liquid in each of a plurality of auxiliary tanks, each of which corresponds to one of the plurality of cleaning tanks, wherein the number of auxiliary tanks equals the number of cleaning tanks, the auxiliary tanks are arranged along a lateral direction of the plurality of cleaning tanks, and each of the auxiliary tanks being divided from the other auxiliary tanks by a dividing plate, such that the cleaning liquid that overflows from each of the cleaning tanks is not mixed with the cleaning liquid that overflows from the other of the cleaning tanks;
    forming a circulating flow of the cleaning liquid in at least one cleaning tank of the cleaning tanks by ejecting the cleaning liquid stored in at least one auxiliary tank from one side of the at least one cleaning tank to an opposite side by means of a first ejection unit and from the opposite side to the one side by means of a second ejection unit, the first and second ejection units being arranged at different heights in said each of the cleaning tanks;
    discharging the foreign matters that settle at a bottom of the at least one cleaning tank via a discharge valve to outside, the bottom of said each of the cleaning tanks having a shape such that the nearer to a center of the bottom, the deeper the bottom becomes, the discharge valve being disposed at the bottom of said each of the cleaning tanks.

* * * * *